(12) United States Patent
Berner et al.

(10) Patent No.: US 11,105,600 B1
(45) Date of Patent: Aug. 31, 2021

(54) IDENTIFICATION METHOD IN A DETONATOR NETWORK

(71) Applicant: Austin Star Detonator Company, Cleveland, OH (US)

(72) Inventors: Joachim Berner, Holzgerlingen (DE); Eduardo Salvador Martinez Regil, Stuttgart (DE)

(73) Assignee: Austin Star Detonator Company, Cleveland, OH (US)

( * ) Notice: Subject to any disclaimer, the term of this patent is extended or adjusted under 35 U.S.C. 154(b) by 449 days.

(21) Appl. No.: 16/330,619

(22) PCT Filed: Dec. 20, 2016

(86) PCT No.: PCT/EP2016/081886
§ 371 (c)(1),
(2) Date: Mar. 5, 2019

(87) PCT Pub. No.: WO2017/148556
PCT Pub. Date: Sep. 8, 2017

(30) Foreign Application Priority Data

Sep. 5, 2016 (DE) ...................... 10 2016 116 567.0

(51) Int. Cl.
*F42D 1/055* (2006.01)
*H04L 12/413* (2006.01)

(52) U.S. Cl.
CPC .......... *F42D 1/055* (2013.01); *H04L 12/4135* (2013.01)

(58) Field of Classification Search
None
See application file for complete search history.

(56) References Cited

U.S. PATENT DOCUMENTS

| 6,837,163 | B2 | 1/2005 | Hallin et al. |
| 7,017,494 | B2 | 3/2006 | Kouznetsov |
| 2006/0011082 | A1 | 1/2006 | Jacobson et al. |
| 2013/0148753 | A1 | 6/2013 | Willms |
| 2015/0159986 | A1* | 6/2015 | Schlenter .................. F42D 1/04 102/311 |
| 2016/0195379 | A1* | 7/2016 | Van Wyk .................. F42D 5/02 102/215 |

FOREIGN PATENT DOCUMENTS

| DE | 102011080476 A1 | 2/2013 |
| DE | 102012200997 A1 | 2/2013 |
| DE | 102011089587 A1 | 6/2013 |
| WO | 2012146631 A1 | 11/2012 |

OTHER PUBLICATIONS

International Search Report and Written Opinion of International Application No. PCT/EP2016/081886 dated Mar. 10, 2017, 10 pages, (with English translation).

* cited by examiner

*Primary Examiner* — Reginald S Tillman, Jr.
(74) *Attorney, Agent, or Firm* — Fay Sharpe LLP (57) ABSTRACT

The invention relates to a method for setting up a network comprising a plurality of electronic detonators and a control unit, which are in connection with each other via a bus system, wherein each of the detonators comprises a communication module which is in connection with the bus system, for a communication between the detonator and the control unit via the bus system and wherein, as a part of the setting up of the network, the detonators are identified by the control unit.

18 Claims, 12 Drawing Sheets

IDENTIFICATION METHOD IN A DETONATOR NETWORK

BACKGROUND OF THE INVENTION

In civil blasting operations such as strip mining or tunnel construction, for example, the precision and the accuracy of the time sequence of individual ignitions are essential for profitability. The blasting operations can consist of up to several thousand individual detonations. Electronic detonators offer very high accuracy and precision, enable the setting up of networks with several hundred or thousand igniters. Programmable electronic igniters moreover lower the storage costs, since it is not necessary to use different detonators for different delay times, but rather each detonator can be programmed with any desired delay time.

Electronic detonators require a timer which gives them the necessary accuracy. As timer, RC oscillators or oscillating crystal oscillators are known. However, RC oscillators are very inaccurate and therefore require a calibration routine which has to be carried out immediately before the blasting. Oscillating crystals offer higher accuracy but, as a rule, they cannot do without the calibration routine. Oscillating crystals moreover have a non-negligible temperature dependence. However, temperature-compensated piezoelectric oscillating crystal oscillators are too expensive for this application and/or they consume a very large amount of energy and/or require too much installation space. In addition, oscillating crystals are very sensitive to shock and therefore in general not optimally suitable for blasting applications.

An additional substantial problem in a network of electronic detonators is the identification of unknown detonators. Indeed, only if the individual detonators are known to the triggering or control unit can bidirectional communication with the latter take place.

DESCRIPTION OF THE INVENTION

Features and advantages of the invention are explained in further detail below in reference to the figures. Here, individual features of the embodiment examples can also be combined with one another in any desired form, even if this is not shown explicitly in the figures and described in the description of the figures. In the figures:

FIG. 1 shows a setup of the detonator
a) electronics with plastic sleeve;
b) spark gap surge protection on printed circuit board;
c) encapsulated electronics unit;
d) assembled detonator;

ELECTRONIC DETONATOR WHICH DOES NOT HAVE TO BE CALIBRATED

The invention relates to an electronic detonator. In an electronic detonator, the time delay for the ignition of the blasting charge is implemented by electronic ignition delay. The electronics require an accurate timer in order to be able to hit the desired blast time in the sequence with high accuracy.

According to the invention, it is proposed that the timer is a MEMS oscillator (micro-electro-mechanical system). Due to the use of MEMS oscillators, a calibration of the detonators before the blasting is no longer necessary. Preferably, the MEMS oscillator is temperature-compensated. The effect of temperature variations on the frequency of the oscillation in the resonator can advantageously be compensated by means of individual temperature sensors and electronic circuit parts. In this manner, the oscillator can be maintained in a frequency-stable manner over the provided temperature range. Temperature-compensated MEMS oscillators have a higher accuracy than oscillating crystal oscillators that are not temperature-compensated and they are also clearly less sensitive to shock. The MEMS oscillator uses a MEMS resonator as frequency-determining element.

Preferably, the MEMS oscillator is a realtime clock (RTC) oscillator. The RTC MEMS oscillator oscillates at 32.768 Hz (often also shortened to 32 kHz). The MEMS oscillator can be arranged on a printed circuit board of an electronic unit. However, it is also conceivable to arrange or integrate the MEMS oscillator in a microchip or microcontroller. It is also conceivable to implement a MEMS oscillator with an encapsulated MEMS resonator. The MEMS resonator is placed on top of a main chip which comprises the oscillator ASIC (Application-Specific Integrated Circuit), bonded and encapsulated with it. In principle, the MEMS resonator can be produced together with other electronic circuits and components on a semiconductor die. As a result, smaller dimensions are possible than are possible with quartz crystal oscillators having a similar field of application. Depending on the construction, MEMS oscillators are frequency stable under mechanical loads, particularly mechanical loads triggered by shock or vibrations.

Figures 1A, 1B:
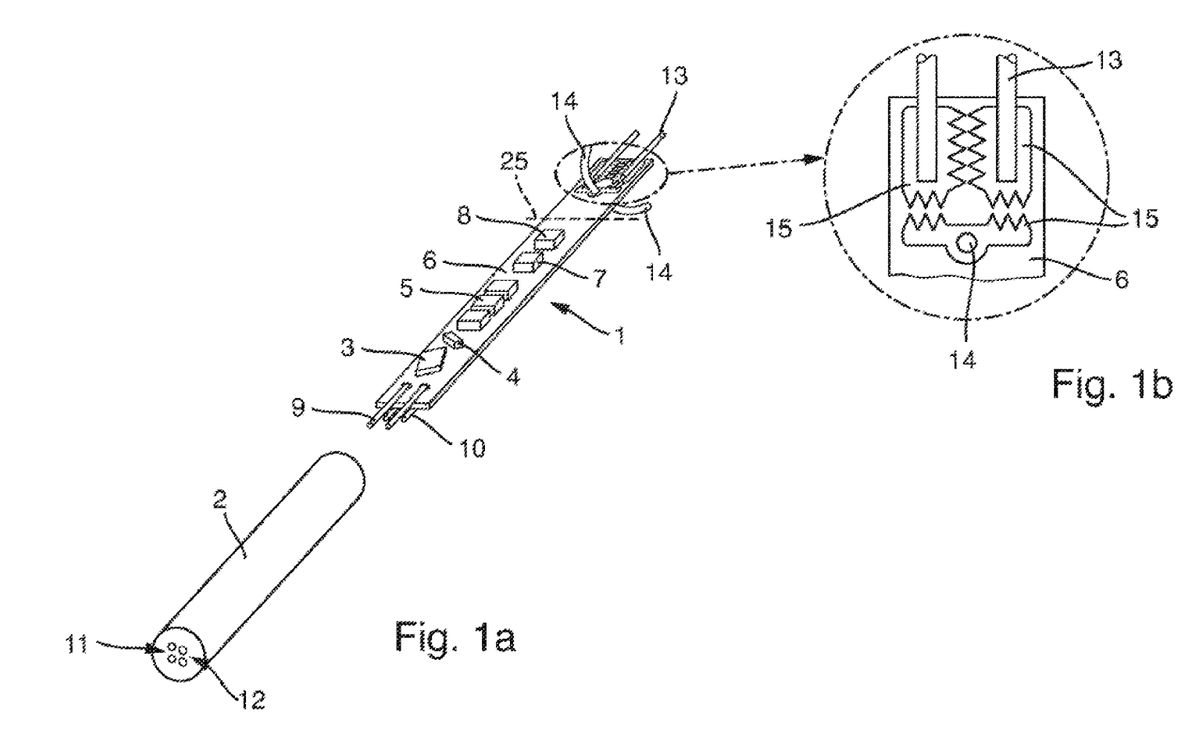
Figure 1C:
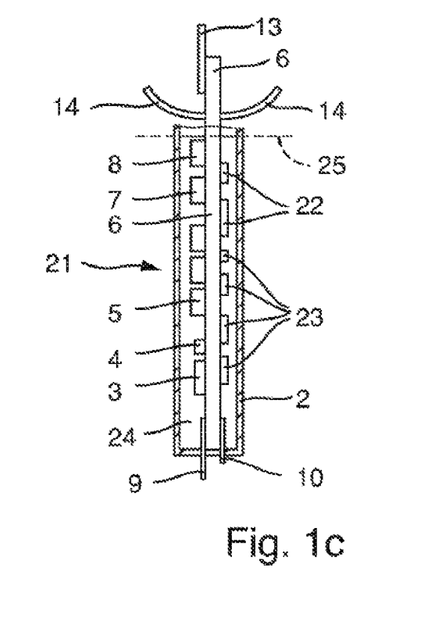

FIG. 1 show the basic setup of an electronic detonator 29. The electronic unit 1 of a detonator 29 comprises a microcontroller 3 (logic, communication and digital delay element), a MEMS oscillator 4 (precise timer), a logic capacitor 5 for storing electrical energy for the self-sufficient current supply of the microcontroller 3 during the ignition sequence, an ignition capacitor 7 for storing electrical energy for the ignition, a suppressor diode (TSV diode) 8, a communication module 22 as well as additional electronic components 23. Preferably, the components 3, 4, 5, 7, 8, 22, 23 are arranged on a printed circuit board 6. Arranged at one end of the printed circuit board 6 are crimp contacts 9 for the connection to an ignition pill 26 and test contacts 10. The printed circuit board 6 is arranged in an encapsulation housing 2. The encapsulation housing 2 has passage holes 11, 12 for the contacts 9, 11. FIG. 1c) shows the electronic unit 1 arranged in the encapsulation housing 2, wherein the encapsulation housing 2 is filled with an encapsulation compound 24 up to an encapsulation limit 25. The encapsulation compound 24 protects the electronic unit 1 from mechanical vibration. At the same time, it also has electrically insulating properties and prevents the penetration of moisture.

On an exposed end of the encapsulation electronic unit 21, three pads 15 are arranged for the protection of the electronic unit 1 from electrostatic discharge (see FIG. 1b). Between the pads 15, a spark gap can form. In particular, when the detonators 29 are lowered into the boreholes, very strong electrostatic charges can be generated. The three-pole spark gap 15 is connected via the wires 14 which function as connection contact to the metal sleeve 17 and via contacts 13 by means of a crimp 99 to a two-core ignition cable 16 and, furthermore, to bus lines of a bus system 30 (compare FIG. 2). The ignition cables 16 are provided with a plastic overmold 18. Reference numeral 19 designates an annular crimp of the metal sleeve 17 on the cable overmold 18. The spark gap forms between the three pads 15, of which two are connected to the ignition cable 16, more precisely in each case to a line of the ignition cable 16. The pads 15 are toothed, and the teeth are opposite one another. If the voltage between the pads 15 (that is to say between the bus lines) exceeds a certain limit value (for example, 100 to 200 V), the breakdown voltage of the air bridge between the tips of the teeth of the pads 15 is exceeded, and an electric arc ignites. The electric pulse is thus discharged before the subsequent electronics 3, 4, 5, 7, 8, 22, 23 in the unit 21 and protects them. The pads 15 operate almost like a lightning conductor. The essential advantage of this protective device is that it can be integrated into the printed circuit board 6 without additional costs.

The third pad 15 is connected to a solder through point. Into the solder through point, a short piece of wire 14 is soldered, which protrudes on both sides of the printed circuit board 6 perpendicularly from the printed circuit board 6 and which forms the contact between the pad 15 (or, in the case of a formed spark gap, between all three pads 15) and the metal sleeve 17. If the encapsulated electronic unit 21 is inserted into the metal sleeve 17 of the detonator 29, the wire 14 contacts the inner wall of the metal sleeve 17 on both sides. The metal sleeve 17 is thus connected to the "three-pole lightning conductor." This is very important, since electrostatic discharge can occur not only between the bus cable cores 16, but also from the metal sleeve 17 to exposed conductive areas in the interior. This can lead to undesired ignitions and must therefore be avoided absolutely.

Figure 1D:
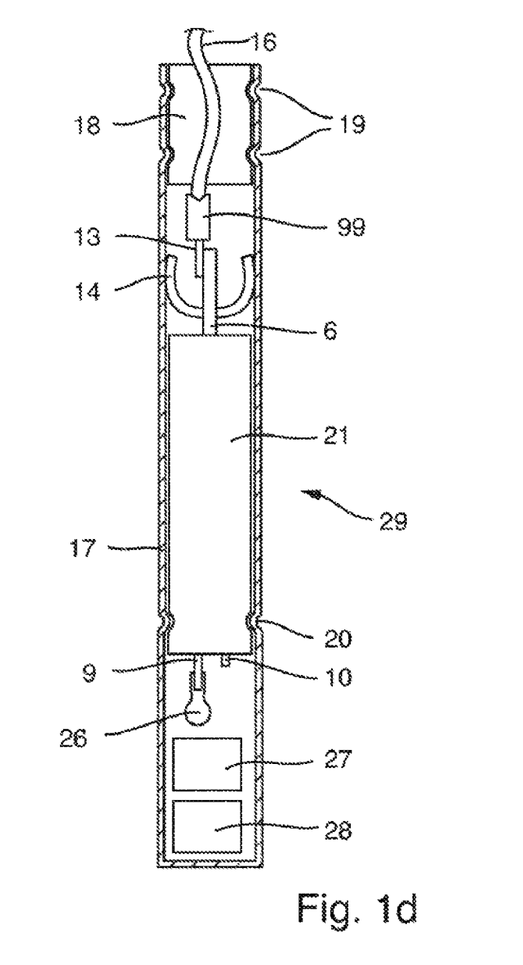

FIG. 1d shows an electronic detonator 29. Said detonator comprises a metal sleeve 17, an electronic unit 21 encapsulated in an encapsulation housing 2, the ignition pill 26, a primary blasting charge 27, and a secondary blasting charge 28. The ignition pill 26 is attached on the end of the electronics. The ignition pill 26 is an approximately match head-sized epoxy resin capsule filled with a pyrotechnic explosive, in the middle of which a tungsten wire is located. The setup is also known as a U-bridge igniter. Via the two contacts of the ignition pill 26, current (the ignition energy) can be allowed to flow over the wire bridge. In the process, the current flow can be triggered by closing an electronic switch (for example, by means of the ignition signal). Starting at a certain current threshold value, the wire heats up so much in the process that it causes the pyrotechnic explosive in the epoxy resin capsule to explode. This explosion ignites the primary charge 27 which in turn ignites the secondary charge 28. The detonator 29 then bursts open at the front due to the high pressure. With the help of this pressure, it is possible to bring about the detonation of a plastic explosive, for example, which in turn is the first step of a detonation sequence. Via the ignition cable 16, for the communication and for the voltage supply, the detonator 29 can be connected via the bus lines of the bus system 30 to a control unit 31.

Figure 2:
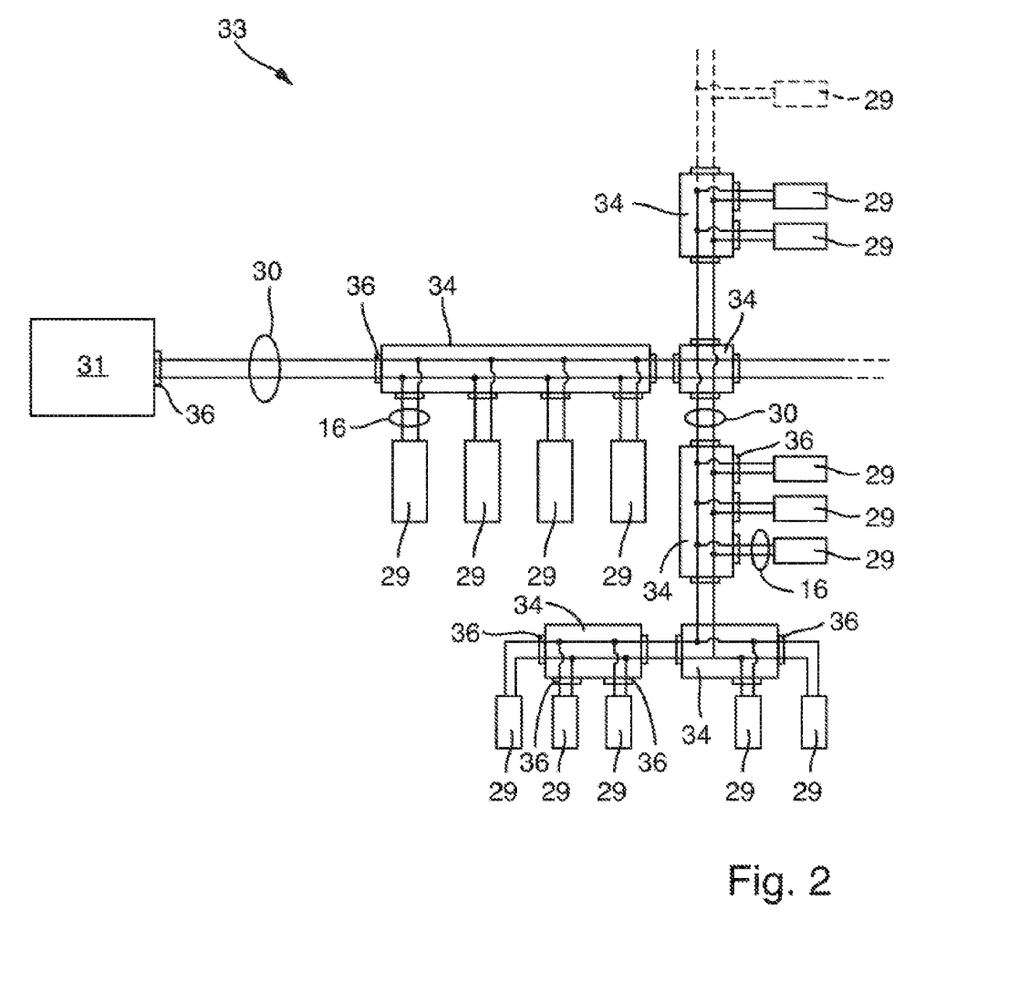
FIG. 2 shows a network of a control unit and of a plurality of detonators.

The invention also relates to an initialization system (or a network) which comprises a plurality of inventive detonators 29 and a control unit 31 to which the detonators 29 can be connected via bus lines of the bus system 30. FIG. 2 shows such a detonator network 33. Via the ignition cable 16 and the bus lines of the bus system 30, a plurality of detonators 29 are connected to the control unit 31 to form the detonator network 33. The bus lines of the bus system 30 are provided for the connection of elements and comprise plug connectors on both sides. In contrast, the ignition cable 16 is implemented with a plug connector on only one side and is connected on the other side rigidly to the detonator 29. During the connection to the control unit 31, the detonators 29 are supplied with voltage preferably directly by said control unit.

In particular, the control unit 31 comprises the following components: a user interface with display and input devices, a computation unit, a communication module. Via the input devices, a user can input commands, in particular, an auto-detection command, an enable command, and a trigger command. These commands are processed by the control unit 31 and converted into corresponding signals (for example, an ignition signal) and transmitted via the bus lines of the bus system 30 to the detonators 29. A transceiver module 46 is part of the communication module of the control unit 31 and represented in FIG. 6.

Figure 3:
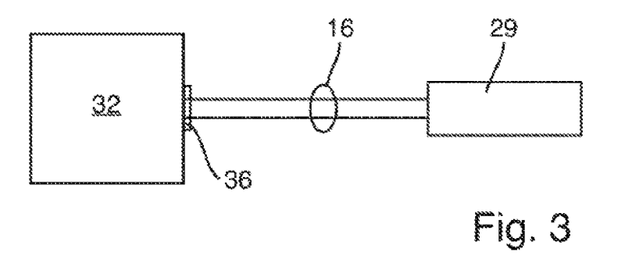
FIG. 3 shows a connection of the programming apparatus to a detonator.
Figure 5:
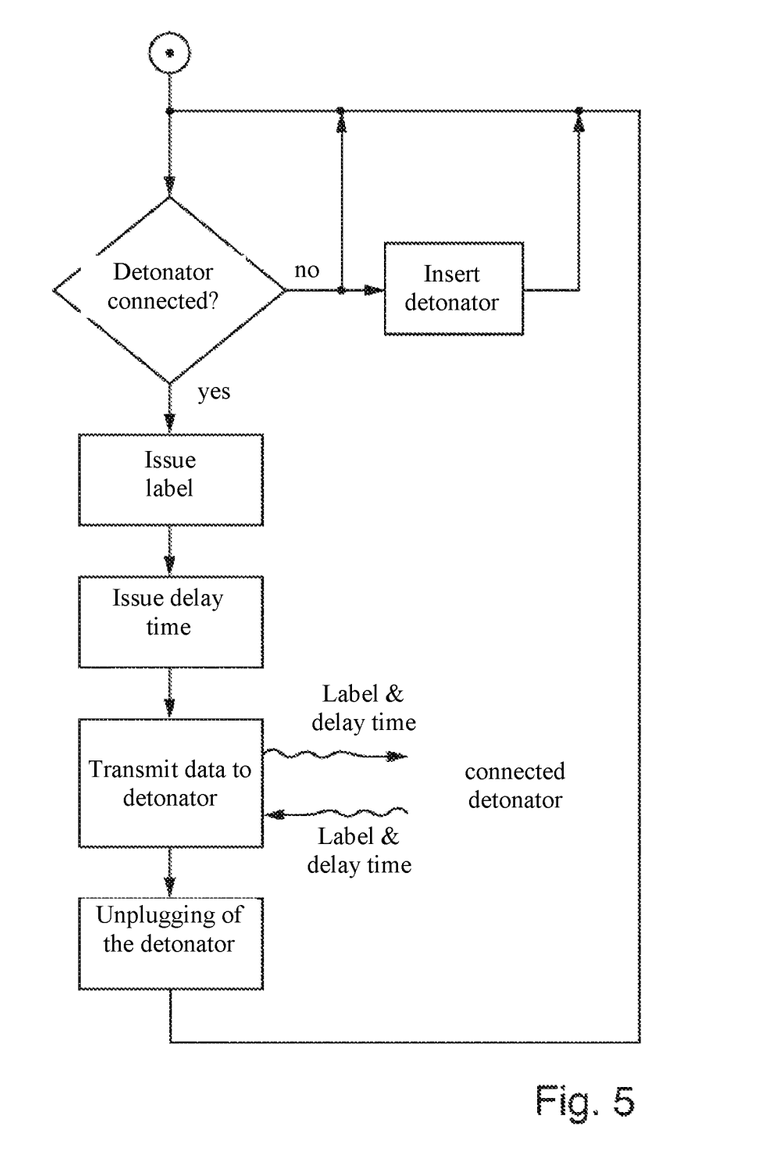
FIG. 5 shows a flow chart of the programming.

FIG. 3 shows a detonator 29 which is connected to a programming unit 32. Via the programming unit 32, a user can program, for example, the ignition delay time, i.e., an individual ignition delay time can be associated with the connected detonator 29. Furthermore, via the programming unit 32, a unique identification, for example, in the form of a field identification number (FID), can be issued. A user can select this FID himself/herself, in order to obtain a better overview of the igniters. Via the FID, the detonator 29 can be found by the user with the control unit 31 in the network. Preferably, the FID is not used for the identification of unknown detonators 29 in the network 33. The FID is a digital labeling of the detonator 29 by the user, which facilitates the usability and handling. FIG. 5 shows a sequence of the programming of a detonator 29 with a programming unit 32.

Figure 4:
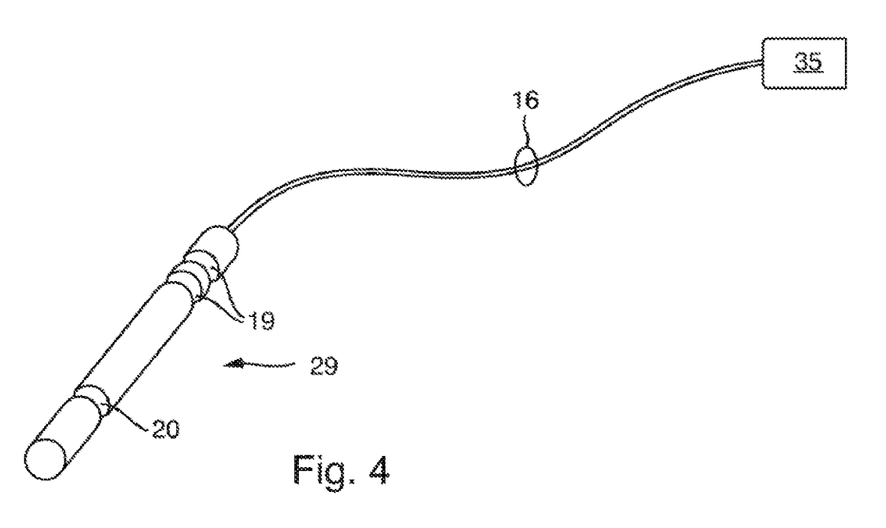
FIG. 4 shows an assembled detonator with cable and plug connector.

FIG. 4 shows a detonator 29 with ignition cable 16 leading out of it, wherein a plug connector 35 is arranged on the ignition cable 16. The plug connector 35 can be connected to a plug connection 36 of a multiple plug connector 34, which is designed to be compatible with the former plug connector (compare, for example, FIG. 2).

Method for Communicating in the Detonator Network

Figure 6:
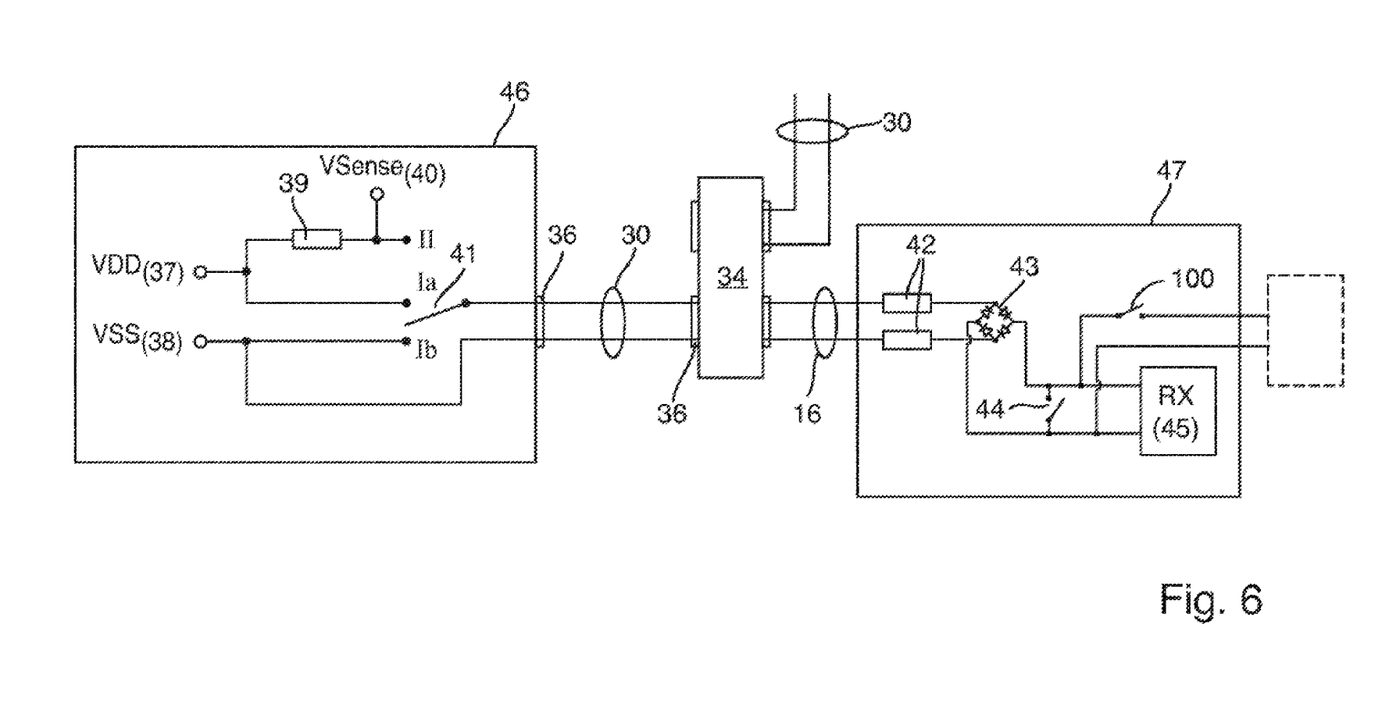
FIG. 6 shows a circuit technological setup of the bus communication.
Figure 7:
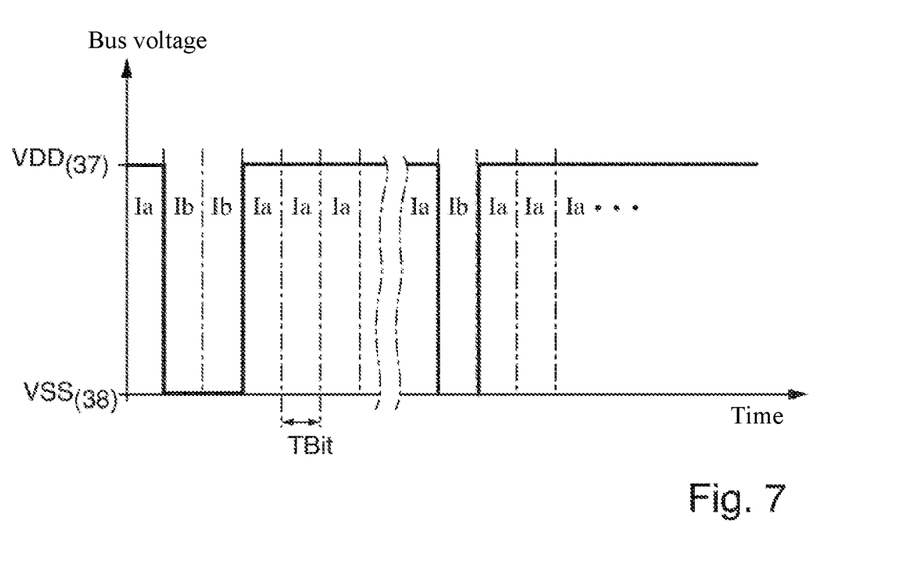
FIG. 7 shows a master-to-detonator communication

In a detonator network 33, the control unit 31 is connected to the detonators 29 preferably via two-wire lines to form a bus system 30, wherein the control unit 31 preferably is the higher-level master unit and the detonators 29 preferably are the lower-level slave units. FIG. 6 shows an embodiment of a basic setup of the circuit for the bus communication. The transceiver module 46 is part of the communication module of the control unit 31. A transceiver switch 41 can assume the switch positions Ia, Ib and II. In the switch position Ia, the master unit 31 applies the high level, that is to say positive bus supply voltage 37 (VDD), to the bus system 30. In the switch position Ib, the master unit 31 applies the low level, that is to say negative bus supply voltage 38 (Vss), to the bus system 30 (compare FIG. 7). In this manner, the master unit 31 can transmit commands such as, for example, an auto-detection command, to the slave units 29. A command consists of a sequence of low level/bits (switch position Ia) and/or high level/bits (switch position Ib). The switch position II is explained below.

The switch 41 is represented in the embodiment shown in FIG. 6 as a three-way switch. This is used for illustrating the mode of operation. Other technical implementations which lead to this functionality are also conceivable.

For the master unit 31 to be able to receive a talkback bit from the detonators 29, the transceiver switch 41 is set to switch position II. Via a connection 40 (Vsense), the voltage on the bus system 30 is measured. If the switch 41 is in the switch position II, the bus system 30 is switched to high impedance via a talkback resistor 39. In this state, the detonators 29 can talk on the bus system 30 by applying a bit (high or low level) (compare FIG. 8). This phase is also designated as talkback phase.

In the talkback phase, in the detonators 29, the bus system 30 is separated via an integrated switch 100 from the logic 3 and the ignition technological circuit 4, 5, 7, 8, in order to reduce the current flow (compare FIG. 6). During the short separation from the bus system 30, that is to say at least for the duration of one bit, the logic 3 of the detonators 29 is preferably supplied from the logic capacitors 5. Thus, during the talkback phase, when the logic 3 and the ignition technical circuit 4, 5, 7, 8 are separated via the integrated switches 100 from the bus system 30, the supply current for the detonators 29, in particular for the logic 3 of the detonators 29, is provided from the logic capacitors 5 and no longer via the bus system 30. When the logic 3 and the ignition technological circuit 4, 5, 7, 8 are not separated from the bus system 30, the logic capacitors 5 of the detonators 29 of the network 33 are charged via the bus system 30.

Furthermore, in FIG. 6, an input stage 47 of a communication module 22 of a detonator 29 is represented. Via a multiple plug connector 34, it is possible to connect several detonators 29 via the bus lines to the bus system 30. In the process, each detonator 29 is connected with the two-core ignition cable 16 via a plug connection 36 to a multiple plug connector 34. The ignition cables 16 are connected via current limitation resistors 42 and a rectifier diode bridge 43 to a receiver unit (Rx) 45 of the input stage 47 of a detonator 29. A talkback switch 44 is closed for the talkback phase, in order to apply a low level/bit to the bus system 30. In order to apply a high level/bit, the switch 44 remains open.

Figure 8:
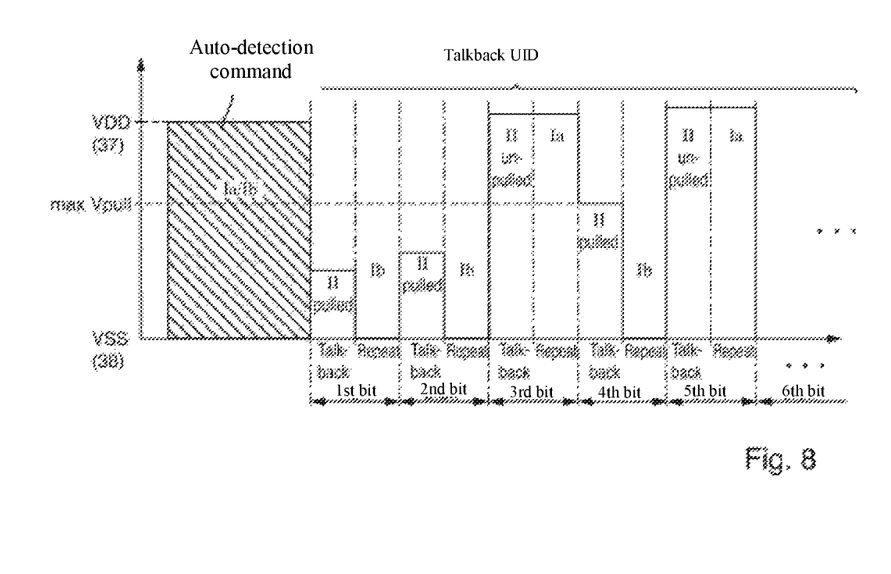
FIG. 8 shows an auto-detection, the transmission of the bits of the UID.

FIG. 8 shows the voltage level on the bus system 30 during the transmission of an auto-detection command and the transmission of bits of the unique identifier (UID) of the detonators 29.

If the switch 41 of the control unit 31 is in the switch position Ia, the high level, that is say a positive bus supply voltage 37 (VDD), is applied on the bus system 30. In the switch position Ib, the low level, that is to say a negative bus supply voltage 38 (Vss), is on the bus system 30 (compare FIG. 7). The auto-detection command consists, for example, of a sequence of low level/bits (switch position Ia) and/or high level/bits (switch position Ib).

If the switch 41 of the control unit 31 is in switch position II, the bus system 30 is switched to high impedance. In order to apply a low level/bit to the bus system 30, the talkback switch 44 of the detonators 29 is closed. In this manner, the bus system 30 is pulled down (pull down). This is designated in FIG. 8 with $II_{pulled}$. In order to apply a high level/bit, the switch 44 remains open. In FIG. 8, this is designated with $II_{unpulled}$.

The programming unit 32 also has a communication unit with a transceiver unit 46. However, this unit is limited in terms of output current for protection technological reasons and moreover it is provided only for communication with individual detonators 29.

Method for Identifying the Detonators in a Network

If one or more detonators 29 are connected to the control unit 31 to form a network 33, the detonators 29 connected to the control unit 31 must be identified by said control unit, so that the network 33 can be set up and operated correctly. The control unit 31 is connected with the detonators 29 via two-wire lines of the bus system 30 to form the network 33, wherein the control unit 31 is preferably the higher-level master unit, and the detonators 29 are preferably the lower-level slave units.

The control unit 31 transmits a global auto-detection command via the bus system 30 to all connected detonators 29. Due to the global auto-detection command, a first loop of the method for identifying the detonators 29 is triggered. The auto-detection command consists, for example, of a sequence of low level/bits and high level/bits. After the reception of the auto-detection command, all the detonators 29 then try to respond simultaneously. For this purpose, the detonators 29 transmit bit-wise the unique identifier number thereof, which is assigned during manufacture (unique identifier—UID). The master unit 31 allows the detonators 29 to pull down (pull down) the bus system 30 for the duration of one bit. After the connection of the detonators 29 to the control unit 31, all the detonators 29 are unknown at first and thus unidentified. All the unknown detonators 29 apply the first identifier bit thereof (low level/bit or high level/bit) to the bus system 30 for the duration of one bit. Due to the application of the first identifier bits by the detonators 29, a second loop of the method is triggered. Within each iteration of the first loop, the second loop is iteratively run through at least once, preferably multiple times.

If the master unit 31 has received the first bit, it repeats said first bit. The detonators 29 then receive the bit repeated by the master unit 31 and thus the talk that actually took place on the bus system 30. The detonators 29 then make a comparison to determine whether the bit applied by them is in agreement with the repeated bit, in that each detonator 29 verifies whether the level (high or low) applied by it is actually on the bus system 30. Here, the high level is recessive and the low level is dominant. If a detonator 29 applies a low level, the bus system 30 is on low, independently of whether other detonators 29 apply high levels. The detonators 29 which have applied high levels see, when the low level is applied by the master unit 31, that the level applied by them is not on the bus system 30. Thereafter, the detonator 29 stops the transmission of the UID thereof and attempts to identify itself again with the master 31 only at the time of the next auto-detection command. If the received bit is in agreement with the sent bit, the detonator 29 transmits the next bit of the UID thereof. The second loop is run through again.

The master unit 31 receives this bit and repeats it. Subsequently, the second loop is run through again. The detonators 29 receive the repeated bit and again compare the bit which was transmitted by them with the repetition of the bit by the bus master 31. After each iteration of the second loop, an additional bit of the unique identifier (UID) of a detonator 29 is thus known. This continues until, in the end, one of the detonators 29 has prevailed, i.e., when one of the detonators 29 has transmitted all the bits of the unique identifier (UID) thereof. The iteration of the first loop is thus stopped, once as many additional bits have been sent out as the unique identifier (UID) of the detonator 29 has bits. The master 31 now knows the UID of this detonator 29, and the detonator 29 is identified in the network 33.

Once a detonator 29 has been identified, it refrains in the case of subsequent auto-detection commands, i.e., it no longer sends the unique identifier thereof (UID) via the bus system 30. The transmission of auto-detection commands by the master unit 31, whereby a run-through of the first loop is triggered, is repeated until no detonator 29 respond any more, that is to say until all the detonators 29 in the network 33 are registered. The first loop is thus run through iteratively in accordance with the number of unidentified detonators 29 in the network 33 at the beginning of the method, wherein, after each run-through of the first loop, an additional detonator 29 is identified.

The method is stopped when the number of identified detonators 29 corresponds to the number of unidentified detonators 29 in the network 33 at the beginning of the method and/or when none of the detonators 29 of the network 33 responds any more to an auto-detection command. Here, it is assumed that a detonator 29 no longer responds if it does not respond within a predetermined time window.

Problems with access to the bus system 30 are solved by the bit-wise arbitration of the UID, which is carried out bit by bit by each slave unit 29 by the monitoring of the bus level. The dominant low is the low level (logic 0) which is preferably associated with the lower voltage level on the bus system 30; the recessive level is the high level (logic 1). All the slave units 29, which apply a recessive bit but receive a dominant bit, of which the previously transmitted bit of the unique identifier (UID) thereof thus does not agree with the received repeat bit, stop the bit-wise transmission of the unique identifier thereof (UID) for the duration of the ongoing run-through of the first loop, and, effective immediately, and from then on are only receivers and no longer have writing access to the bus system 30. The slave units 29 receive the bit repeated by the master unit 31, that is to say the higher-prioritized message and thus do not attempt to transmit any longer, until the bus system 30 is free again and an additional auto-detection command is sent from the master unit 31 to the bus system 30. These slave units 29 resume the bit-wise transmission of the unique identifier thereof (UID) only at the time of the next run-through of the first loop after having again received an auto-detection command of the control unit 31.

In this manner, the detonator 29 with the UID having the highest priority always prevails. Since the UIDs are unique and distinct, no collision results in the identification of the detonators 29 with the control unit 31.

If a detonator 29 having the highest priority has prevailed and thus talks back to the control unit 31, the control unit 31 advantageously transmits a registration message to the detonator 29. The registration message preferably contains a short temporary identification number STID (Short Temporary Identification Number), by means of which the detonator 29 can be addressed for all subsequent communication. In response to the registration message, the detonator 29 advantageously transmits the stored delay time thereof, the field identification number FID thereof, and preferably additional data such as, for example, self-test status, to the control unit 31. This process is represented diagrammatically in FIG. 9a.

Figure 10:
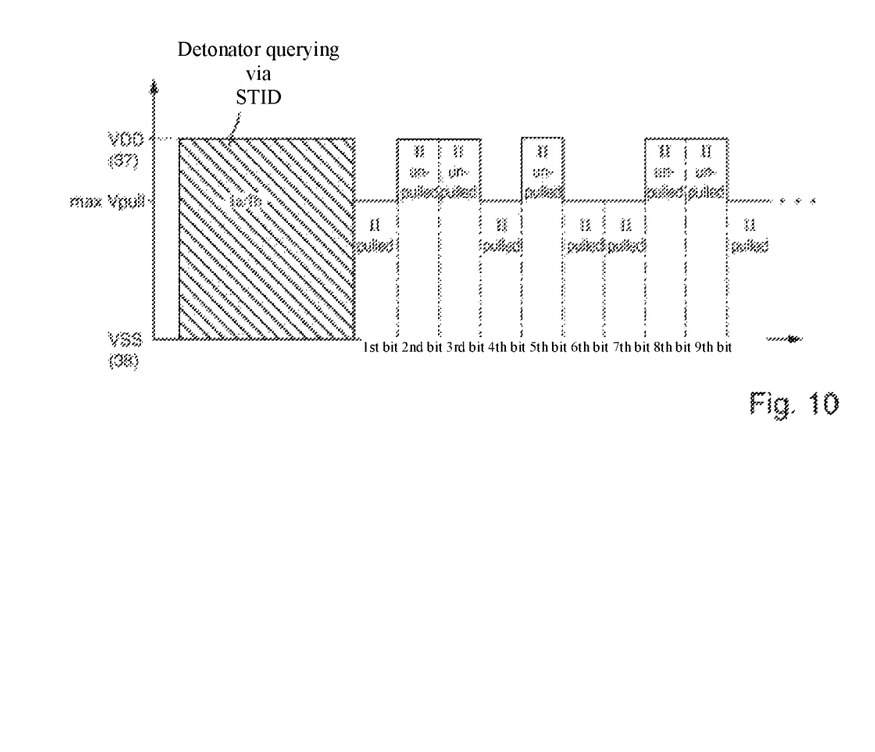
FIG. 10 shows a detonator-to-master data communication.

After the successful identification of a detonator 29 in the master unit 31, the master unit 31 can address this detonator 29 directly. This can occur, for example, via the UID (compare FIG. 10). It is conceivable that the master 31 addresses the detonator 29 via the transmitted STID. This STID is unique in the detonator network 33 and can be shorter than the UID.

For secured data transmission on the bus system 30, it is advantageous to carry out an error detection (Error Detection) and/or error correction (Error Correction). For the error correction it is possible to use, for example, a linear error-correcting block code, in particular a Hamming code. By means of such an error correction method, the bit sequences are changed. Thereby, the sequence order of the transmitted UID can also be changed, since the UID are no longer transmitted in a sequence order according to the priority of the original bit sequence thereof, but rather are transmitted according to the priority of the bit sequence generated by the error correction method. The bit sequence generated by the error correction method is unique. I.e., by means of the error correction method, a unique bit sequence is associated with each detonator 29. This bit sequence may be longer than the bit sequence of the UID. Advantageously, the bit sequence generated by means of the error correction method is redundant. Thus, there is no risk of collision and the bit-wise arbitration continues to work, since the sequence order of the detection of the detonators 29 plays no role.

Charging Current Limitation Via Pulse Width Modulation

The electronic unit 1; 21 of a detonator 29 preferably comprises several capacitors or capacitor banks (it is possible to connect several capacitors to form one overall capacitance). In particular, this involves the ignition capacitor 7 and the logic capacitor 5. The logic capacitor 5 is preferably used for storing electrical energy for the self-sufficient current supply of the microcontroller 3 of the electrical unit 1; 21 of the detonator 29 during the ignition sequence. Preferably, the electrical unit 1; 21 of the capacitor 5 is also supplied during the talkback phase (during the communication via the bus connection with the control unit 31) via the logic capacitor 5. The ignition capacitor 7 is used for storing electrical energy for the ignition. It is conceivable that, during an ignition sequence, the electrical unit 1; 21, in particular the microcontroller 3 and/or the logic of the detonator 29, is also supplied from the ignition capacitor 7.

These capacitors 5, 7 can be charged via the bus connection of the detonator 29 to the control unit 31, that is to say, for example, via the bus lines of the bus system 30. If several detonators 29 are connected via such a bus system 30 to form a detonator network 33, then, in the case of simultaneous charging of several capacitors, high currents can flow via the bus line. Exceeding the permissible current for a bus line must be avoided. Advantageously, a current limitation can be achieved via a pulse width modulation. The charging current is thus a PWM-restricted current.

The logic capacitors 5 of the detonators 29 are preferably charged during the connection of the detonators 29 to a control unit 31 via the bus system 30. When all the logic capacitors 5 are charged simultaneously, high currents can in principle occur. Due to the pulsed charging, the root mean square currents flowing can be reduced at will, in order to comply with the specifications of the bus lines.

The ignition capacitors 7 of the detonators 29 are charged only if a so-called enable command has occurred. This enable command is preferably input into the control unit 31 by an operator via a user interface. If several ignition capacitors 7 are charged simultaneously, high currents can in principle occur. Due to the pulsed charging, the root mean square currents flowing can be reduced at will, in order to comply with the specifications of the bus lines.

Encoding of Commands

In order to prevent unauthorized use of the detonators 29, they can preferably be triggered only using the original equipment, i.e., using the associated control unit 31. Advantageously, with the control unit 31, enable code pairs are generated, consisting, in particular, of a test code and an enable code. The test code of an enable code pair is transmitted via the bus system 30 to the detonators 29. Advantageously, each detonator 29 can derive the corresponding enable code from the received test code. An enable command or an ignition command can be transmitted effectively only with a matching associated enable code. Without the respective enable code, a detonator 29 cannot be enabled or triggered. A test code is preferably used only once. Advantageously, each time the detonators 29 are connected to the control unit 31 or the bus connection between the detonators 29 and the control unit 31 is newly set up, a new test code is generated and distributed to all the detonators 29. Thus, these commands cannot be simply copied, and the detonators 29 cannot be triggered without the associated control unit 31. The control unit 31 itself is preferably protected with a password. This password has to be input before the use of the control unit 31. Without the successful input of the password, no enable or ignition commands can be input via the control unit 31. The transmission of the test code and of the enable code occurs preferably in encoded form. The keys required for the encoding are preferably stored in the control apparatus 31 and/or in the detonators 29. In particular, the keys can be client-specific. It is conceivable that several enable codes can be derived from a test code.

Figure 11:
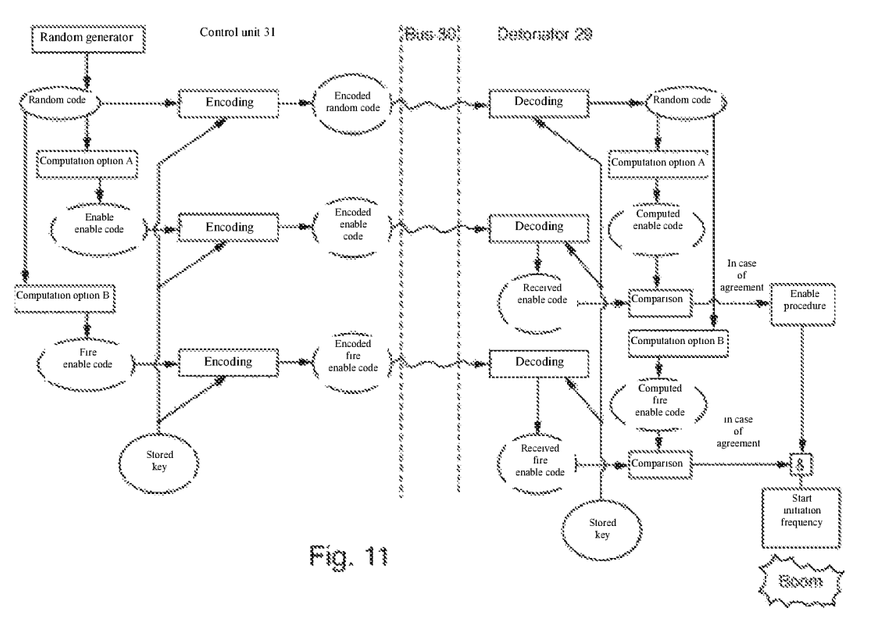
FIG. 11 shows a sequence of the encoding of commands in a detonator system.

FIG. 11 represents the sequence of the generation of a key pair by means of a random code generator until the detonator 29 is triggered. The enable code transmits the enable command by means of which the charging of the ignition capacitors 7 is started. The fire enable code transmits the ignition command for triggering the detonators 29.

Figure 9A:
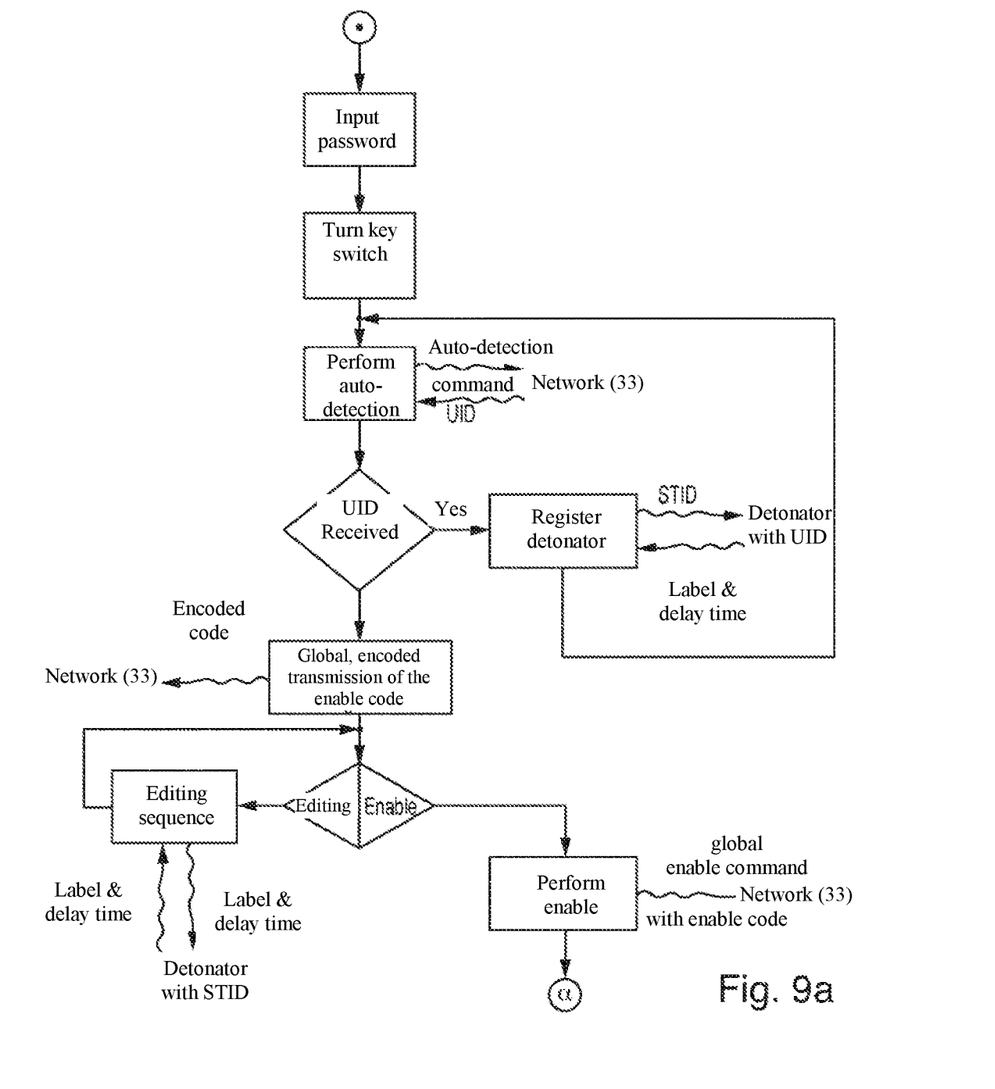
FIGS. 9a and 9b show a flow chart of a blasting operation with a control unit and a network of detonators.
Figure 9B:
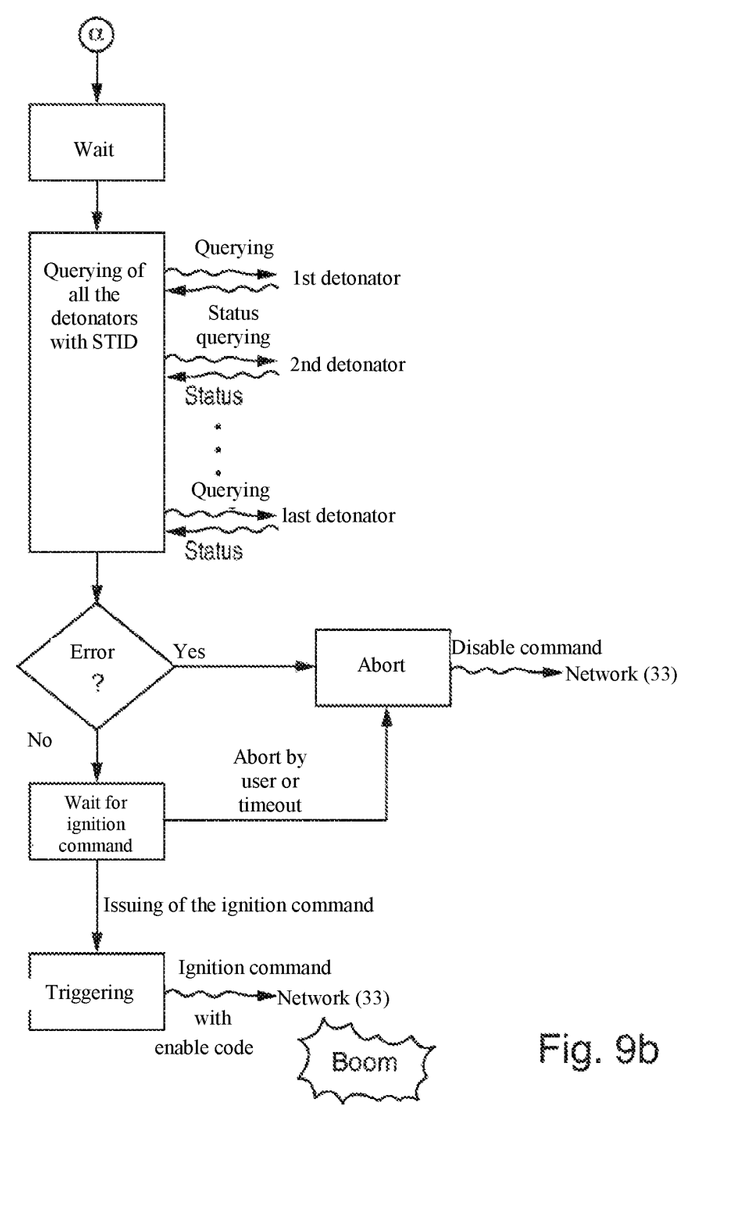

FIGS. 9a and 9b show a flow chart of a blasting operation with a control unit 31 and with a network 33 of detonators 29. The control unit 31 is unlocked by the input of a password. Preferably, the control unit 31 is additionally secured via a key switch. For enabling the control unit 31, the key switch then also needs to be actuated as well.

By means of the above-described method for the identification, detonators 29 connected in the network 33 are detected, identified and registered. Subsequently, the above-described method for encoding the enable and ignition commands is carried out. After the enable command, by means of which a charging of the ignition capacitors 7 is initiated, the status of each detonator 29 is queried via the master unit 31. The respective detonator 29 either reports that it is in an ignition-ready state, i.e., among other factors, that the ignition capacitor 7 has been charged sufficiently, or it transmits an error message. When all the detonators 29 have reported back successfully indicating their ignition readiness, the ignition command can be issued. The ignition command initiates the triggering of the detonators 29.

LIST OF REFERENCE NUMERALS

1 Electronic unit
2 Encapsulation housing
3 Microcontroller
4 MEMS oscillator
5 Logic capacitor
6 PCB (printed circuit board)
7 Ignition capacitor
8 Suppressor diode (TVS diode)
9 Crimp contacts for ignition pill
10 Test contacts
11 Passage holes for crimp contacts
12 Passage holes for test contacts
13 Crimp contacts for bus cable
14 Connection contact to metal housing
15 Printed circuit board-integrated spark gap for protection against static electricity
16 Two-core ignition cable
17 Metal sleeve
18 Plastic overmold of the cable
19 Annular crimping of the metal sleeve on the cable overmold
20 Annular crimping of the metal sleeve on the encapsulated electronics unit (21)
21 Encapsulated electronics unit
22 Communication module
23 Other electronic components
24 Encapsulation compound
25 Encapsulation limit
26 Ignition pill
27 Primary charge
28 Secondary charge
29 Electronic detonator
30 Two-core bus system
31 Control unit
32 Programming unit
33 Detonator network
34 Multiple plug connector
35 Plug connector
36 Plug connection
37 Bus supply voltage positive VDD
38 Bus supply voltage negative VSS
39 Talkback resistor
40 Bus voltage measurement
41 Transceiver switch
42 Current limitation resistors
43 Rectifier diode bridge
44 Talkback switch
45 Receiver unit
46 Transceiver module of the control unit (31)
47 Input stage of the detonator (29)
99 Crimping
100 Switch

The invention claimed is:

1. A method for setting up a network comprising a plurality of electronic detonators and a control unit, which are in connection with each other via a bus system, wherein each of the detonators comprises a communication module which is in connection with the bus system, for a communication between the detonator and the control unit via the bus system and wherein, as a part of the setting up of the network, as yet unidentified detonators are identified by the control unit, characterized in that a unique identifier is associated with each of the detonators and that, in the context of the identification of the detonators, a bit-wise bidirectional communication between the control unit and the detonators is carried out in the network, wherein a first loop is run through iteratively in accordance with the number of unidentified detonators in the network, wherein, after each run-through of the first loop, an additional detonator is identified, and in each iteration of the first loop, in accordance with the number of bits of the unique identifier (UID) of the detonators, a second loop is iteratively run through, wherein, in each iteration of the second loop, the as yet unidentified detonators transmit a bit of the unique identifier (UID) thereof and apply it to the bus, and, after each iteration of the second loop of the control unit, an additional bit of the unique identifier (UID) of a detonator is known, wherein problems of access to the bus system are solved by a bit-wise arbitration which is carried out bit by bit by each detonator by a monitoring of the level on the bus system.

2. The method according to claim 1, characterized in that, at the end of the execution of the first and second loops, all the detonators in the network are identified.

3. The method according to claim 1 wherein each iteration of the first loop is triggered by a global auto-detection command which is transmitted by the control unit via the bus system to the detonators of the network.

4. The method according to claim 3, wherein the auto-detection command comprises several bits.

5. The method according to claim 3, wherein, in the context of the iteration of the first loop,
the detonators of the network receive the auto-detection command,
all the as yet unidentified detonators of the network apply, in response to the auto-detection command, a first bit of the unique identifier (UID) thereof to the bus system,
the control unit receives the applied first bits,
the control unit selects a received first bit and applies it as repeat bit to the bus system,
the detonators receive the repeat bit,
the as yet unidentified detonators compare the received repeat bit with the first bit of the unique identifier (UID) thereof, first bit which was previously applied by them, and
the as yet unidentified detonators of which the previously applied first bit of the unique identifier (UID) thereof is in agreement with the received repeat bit apply an additional bit of the unique identifier (UID) thereof to the bus system,
the control unit receives the applied additional bits, and
if, due to the transmission of the additional bits, the number of bits of the unique identifiers (UID) of the detonators is reached, a detonator of the network is identified, and the second loop and the ongoing iteration of the first loop are stopped.

6. The method according to claim 5, wherein due to the application of the additional bits, the number of bits of the unique identifiers (UID) of the detonators is not yet reached, in the context of the first loop, moreover
the control unit selects a received additional bit and applies it as repeat bit to the bus system,
the detonators receive the repeat bit,
the as yet unidentified detonators compare the received repeat bit with the additional bit of the unique identifier (UID) thereof, additional bit which was previously applied by them,
the as yet unidentified detonators of which the previously applied additional bit of the unique identifier (UID) thereof is in agreement with the received repeat bit apply an additional bit of the unique identifier (UID) thereof to the bus system,
the control unit receives the applied additional bits, and
the above steps of the second loop are repeated until, due to the transmission of the additional bits, the number of bits of the unique identifiers (UID) of the detonators is reached, and an additional detonator of the network is identified, and the ongoing iteration of the first loop is stopped.

7. The method according to claim 5, wherein after the iteration of the first loop is stopped, if as yet unidentified detonators are present in the network, the first loop is run through again, and the steps of claim 5 or of claims 5 and 6 are carried out again, so that an additional detonator of the network is identified.

8. The method according to claim 7, wherein the method is stopped if the number of identified detonators corresponds to the number of as yet unidentified detonators in the network at the beginning of the method and/or if none of the detonators of the network responds any more to an auto-detection command.

9. The method according to claim 5, wherein if the received bits comprise a dominant bit, the control unit selects a dominant bit from the received bits and applies it as repeat bit on the bus system, and, if the received bits comprise no dominant bit, the control unit selects a recessive bit and applies it as repeat bit.

10. The method according to claim 9, wherein the dominant bit corresponds to a dominant level, particularly a low level (logic 0), of the bus system, which is associated with a lower voltage level on the bus system.

11. The method according to claim 5, wherein the as yet unidentified detonators of which the previously applied bit of the unique identifier (UID) thereof is not in agreement with the received repeat bit, stop, for the duration of the ongoing iteration of the first loop, the bit-wise transmission of the unique identifier (UID) thereof, and resume the bit-wise transmission of the unique identifier (UID) thereof again only in the next iteration of the first loop, after a re-reception of an auto-detection command of the control unit.

12. The method according to any one of claim 1, wherein subsequent to an identification of a detonator which has occurred, the control unit transmits a registration message, preferably with a temporary identification number (STID), via which the detonator can be addressed for the subsequent communication, to the identified detonator.

13. The method according to claim 12, wherein the detonator, in response to the registration message, transmits the stored delay time thereof and preferably additional data, such as, for example, the self test status, to the control unit.

14. The method according to any one of claim 1, wherein each of the detonators has a logic and an ignition-technological circuit, wherein the logic and the ignition-technological circuit of the detonators are separated from the bus system via a switch integrated in each case in the detonator, at least for the duration of a transmission of a bit by the detonators.

15. The method according to claim 14, wherein a current supply of the logic of the detonators occurs, during the separation from the bus system, from the logic capacitors integrated in the detonators.

16. The method according to claim 15, wherein in the case of absence of separation from the bus system, the logic capacitors of the detonators of the network charged via the bus system.

17. The method according to claim 1, wherein by the as yet unidentified detonators, the unique identifier (UID) thereof is transmitted, not in the bit sequence of the unique identifier (UID), but rather in an error-corrected bit sequence, and is received by the control unit, wherein the control unit can derive the unique identifier (UID) of the detonators from the received error-corrected bit sequence.

18. The method according to claim 17, wherein the bit sequence is error-corrected by means of a Hamming code.

\* \* \* \* \*